United States Patent Office 3,280,158
Patented Oct. 18, 1966

3,280,158
2-METHYLENE-3β,17β-DIHYDROXY ANDRO-
STANES AND PROCESS THEREFOR
John Edwards, Mexico City, Mexico, assignor, by mesne
assignments, to Syntex Corporation, a corporation of
Panama
No Drawing. Filed Jan. 31, 1962, Ser. No. 170,269
9 Claims. (Cl. 260—397.5)

The present invention relates to certain new cyclopentanophenanthrene derivatives and to a method for making the same.

More particularly, it refers to the novel 2-methylene-testosterone, 2 - methylene-3β,17β-dihydroxy-androstane and Δ⁴-androstene derivatives, which may be further substituted at C-17α by an alkyl, alkenyl or alkynyl group; to the corresponding 19-nor compounds and the esters thereof.

The compounds object of the present invention are represented by the following formulas:

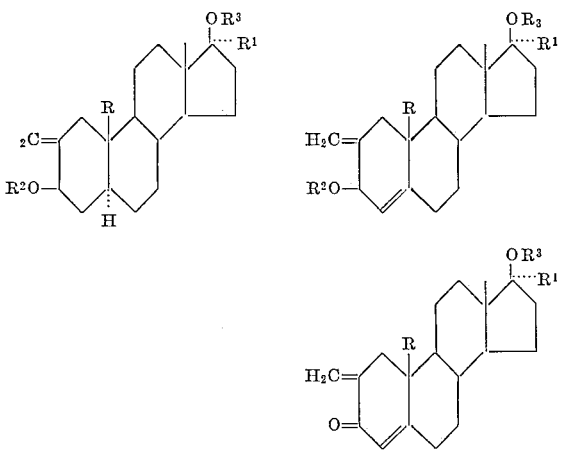

In the above formulas, R represents hydrogen or methyl; R¹ represents hydrogen, alkyl, alkenyl or alkynyl containing up to 8 carbon atoms; R² and R³ represent hydrogen or the acyl residue of a hydrocarbon carboxylic acid containing up to 12 carbon atoms, saturated or unsaturated, straight chain or branched chain aliphatic, cyclic, cyclic-aliphatic, aromatic and which may be substituted with hydroxy, alkoxy, amino or halogen. Typical such ester groups are the acetate, propionate, isobutyrate, hemisuccinate, enanthate, benzoate, caproate, phenoxyacetate, aminoacetate, trimethylacetate and β-chloropropionate.

The novel compounds of the present invention are potent anabolic agents with a favorable anabolic-androgenic ratio. They exhibit anti-estrogenic and anti-gonadotrophic activities, and are useful in the treatment of premenstrual tension. In addition to these, the compounds object of the present invention lower the blood cholesterol level and have anti-fibrillatory activity.

The 2-methylene-3β,17β-dihydroxy-androstane and Δ⁴-androstene derivatives are obtained by a process illustrated by the following sequence of reactions:

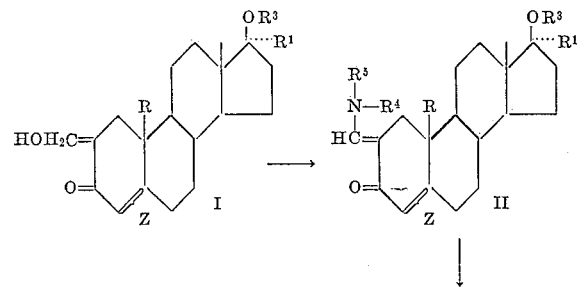

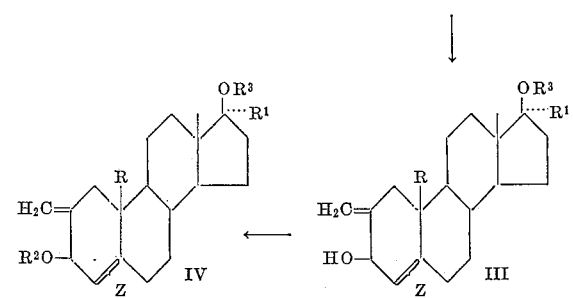

In the preceding formulas, R, R¹, R² and R³ have the same meaning as heretofore set forth; Z represents a double bond or a saturated linkage between C-4,5 and in the case of the saturated compounds the hydrogen atom at C-5 is in α-configuration. R⁴ and R⁵ represent hydrogen, alkyl or dialkyl, aminoalkyl containing up to eight carbon atoms, or R⁴ and R⁵ together with the nitrogen atom for a heterocyclic radical such as piperidino, morpholino, pyrrolidino or piperazino.

In practicing the process above illustrated, a 2-hydroxymethylene-17β-ol-3-one compound, i.e. 2-hydroxymethylene - testosterone, 2-hydroxymethylene-dihydroallotestosterone, the corresponding 17α-alkyl, alkenyl or alkynyl derivatives or its esters and the corresponding 19-nor compounds (I), is treated with an excess of a primary, secondary or tertiary amine, such as for example diethylamine, methylamine, methylaniline, piperidine, morpholine, pyrrolidine or the like, to give the corresponding 2-aminoethylene derivative (II). The reaction is generally conducted in a solvent inert to the reactants, which may or may not be the amine itself, at reflux temperature and for a short period of time, of the order of 10 minutes to 1 hour. When a volatile amine is used, the condensation is effected in benzene solution, under pressure, for 1 to 2 hours.

The resulting 2-aminomethylene compounds (II) are then reduced with sodium borohydride in methanol solution at room temperature for 5 to 8 hours in the case of the saturated compound, or in tetrahydrofuran and at reflux temperature for 6 to 8 hours (more drastic conditions) for the Δ⁴ derivatives. By this reaction, reduction at both C-2 and C-3 occurs with elimination of the amine, thus producing the 2-methylene-3β,17β-hydroxy compounds (III).

The 2-methylene derivatives of androstane-3β,17β-diol and Δ⁴-androstene-3β,17β-diol, as well as the corresponding 19-nor-compounds may be optionally esterified with acid anhydrides or chlorides of less than 12 carbon atoms, in pyridine solution, to give the corresponding diesters (IV; R¹=H, R² and R³=acyl), while esterification under the same conditions of the 17α-alkyl, alkenyl and alkynyl compounds produce the 3-monoesters (IV; R'=alkyl, alkenyl alkylnyl; R²=acyl; R³=hydrogen).

In order to obtain the 3,17-diesters of 2-methylene-17α-alkyl, alkenyl and alkylnyl derivatives of androstane-3β,17β-diol, Δ⁴-androstene-3β,17β-diol, as well as of the corresponding 19-nor-compounds, there are used as starting materials the esters of 2-hydroxymethylene-17α-alkyl, alkenyl or alkylnyl-androstan-17β-ol-3-one or those of the corresponding Δ⁴-dehydro and 19-nor-compounds.

Thus for example, 2-hydroxymethylene-17α-methyl-dihydroallotestosterone-actate is refluxed with piperidine in benzene solution, during 15 minutes to produce 2-piperidylmethylene - 17α - methyl-androstan-17β-ol-3-one-acetate, which upon reduction with sodium borohydride in methanol solution gives 2-methylene-17α-methyl-androstane-3β,17β-diol-17-monoacetate. Further esterification of this compound with propionic anhydride in pyridine solution gives 2-methylene-17α-methyl-androstane-3β,17β-diol-3-propionate-17-acetate.

The 2-methylene-testosterone derivatives are obtained by a process illustrated by the following equation:

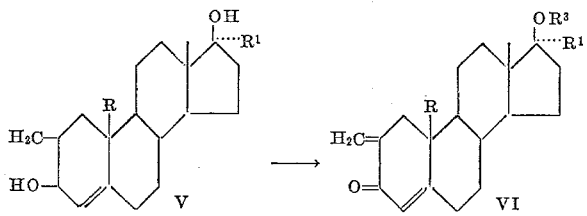

In the above formulas, R, R¹ and R³ have the same meaning as heretofore set forth.

In practicing the process outlined above, 2-methylene-Δ⁴-androstene-3β,17β-diol, 2-methylene-19-nor-Δ⁴-androstene-3β,17β-diol or the corresponding 17α-substituted derivatives are oxidized with manganese dioxide in chloroform solution, in accordance with the method described by Sondheimer et al. in J. Am. Chem. Soc. 75, 5930 (1953) to give the corresponding Δ⁴-3-ketones (VI; R³=H). Alternatively this oxidation may be effected with 1.1 equivalents of 2,3-dicholro-5,6-dicyano-1,4-benzoquinone, at room temperature for a period of time in the order of 8 to 24 hours.

Esterification of 2-methylene-testosterone and 2-methylene-19-nor-testosterone with acid anhydrides or chlorides in pyridine solution give rise to the corresponding esters (VI; R¹=hydrogen, R³=acyl).

In order to obtain the 17-esters of 2-methylene-17α-alkyl, alkenyl or alkynyl testosterone, the oxidation is carried out using as starting material a 17-ester of 2-methylene-17α-substituted Δ⁴-androstene-3β,17β-diol.

The following examples serve to illustrate but are not intended to limit the scope of the present invention:

EXAMPLE I

A mixture of 5 g. of 2-hydroxymethylene-17α-methyl-dihydroallotestosterone, 125 cc. of benzene and 5 cc. of piperidine was refluxed for 10 minutes, then evaporated to dryness, and the residue was purified by crystallization from benzene, thus yielding 2-piperidylmethylene-17α-methyl-androstan-17β-ol-3-one with M.P. 242–244° C.; [α]$_D$–255° (chloroform);

$\lambda_{max.}^{EtOH}$ 334 mµ, log ε 4.37

A solution of 5.7 g. of the preceding compound in 170 cc. of methanol was treated with 5.7 g. of sodium borohydride previously dissolved in 170 cc. of methanol. The reaction was left for 5 hours at 0° C., water was then added and the product extracted with methylene chloride; the organic extract was washed to neutral with water, dried over anhydrous sodium sulfate and evaporated to dryness. After crystallization from acetone-hexane, there was obtained 2-methylene-17α-methyl-androstane-3β,17β-diol; M.P. 233–235° C., [α]$_D$ —36.4° (CHCl$_3$).

A mixture of 1 g. of the preceding 2-methylene compound, 4 cc. of pyridine and 2 cc. of acetic anhydride was kept at room temperature overnight, poured into ice water, the formed precipitate was filtered, washed with water and dried. Crystallization from acetone-hexane gave 2-methylene-17α-methyl-androstane 3β,17β-diol-3-monoacetate.

EXAMPLE II

A mixture of 1 g. of 2-hydroxymethylene-17α-methyl-dihydroallotestosterone, 2 g. of dimethylamine and 20 cc. of benzene was heated in a sealed tube for half an hour at 75° C. The mixture was then washed with water, the benzene was evaporated and the residue was purified by chromatography on neutral alumina, thus furnishing 2-dimethylaminomethylene-17α-methyl-androstan-17β-ol-3-one.

The above compound was reduced with sodium borohydride in methanol solution, in accordance with the method of the preceding example, to give 2-methylene-17α-methyl-androstane-3β,17β-diol, identical to that obtained in Example I.

EXAMPLE III 2 g. of 17α-ethynyl-dihydroallotestosterone was treated with ethyl formate in the presence of sodium hydride, in accordance with the method described by Ringold et al. in J. Am. Chem. Soc. 81, 427 (1959), or U.S. Patent 2,908,693, to produce the 2-hydroxymethylene derivative of 17α-ethynyl-androstan-17β-ol-3-one. The above compound was condensed with piperidine, by following the method of Example I, and the resulting piperidylmethylene compound was in turn reduced with sodium borohydride, thus giving 2-methylene-17α-ethynyl-androstane-3β,17β-diol.

Esterification of this compound with acetic anhydride in pyridine solution gave the 3-acetate of 2-methylene-17α-ethynyl-androstane-3β,17β-diol.

In another experiment, there was used as starting material the acetate of 17α-ethynyl-dihydroallotestosterone; there was thus obtained successively 2-hydroxymethylene-17α-ethynyl-androstan-17β-ol-3-one-acetate, 2-piperidylmethylene-17α-ethynyl-androstan-17β-ol-3-one-acetate, 2-methylene-17α-ethynyl-androstane-3β,17β-diol-17-acetate and the diacetate of 2-methylene-17α-ethynyl-androstane-3β,17β-diol.

EXAMPLE IV

To a solution of 5 g. of 2-hydroxymethylene-17α-vinyl-19-nor-androstan-17β-ol-3-one (obtained by condensing 17α-vinyl-19-nor-dihydroallotestosterone with ethyl formate in the presence of sodium hydride, in accordance with the method described in U.S. Patent No. 2,908,693) in 150 cc. of benzene, there was added 10 cc. of pyrrolidine, and the mixture was refluxed for 10 minutes; it was then evaporated to dryness and the residue crystallized from acetone-ether, thus giving 2-pyrrolidylmethylene-17α-vinyl-19-nor-androstan-17β-ol-3-one.

Upon reduction of the above compound with sodium borohydride, by following the method of Example I, there was produced 2-methylene-17α-vinyl-19-nor-androstane-3β,17β-diol.

EXAMPLE V

A mixture of 2 g. of 2-hydroxymethylene-dihydroallotestosterone, 125 cc. of benzene and 5 cc. of morpholine was refluxed for 15 minutes; it was then evaporated to dryness under reduced pressure and the residue, consisting of the 2-morpholinylmethylene-androstane-17β-ol-3-one was reduced with sodium borohydride in methanol solution to produce 2-methylene-androstane-3β,17β-diol, which was purified by crystallization from acetone-ether.

500 mg. of the above compound in 1 cc. of pyridine was treated with 1 cc. of benzoyl chloride and then heated on the steam bath for one hour. The mixture was then poured into ice water and the formed precipitate collected, washed with water and dried. Recrystallization from methylene chloride-hexane afforded the dibenzoate of 2-methylene-androstane-3β,17β-diol.

When using acetic, propionic and caproic anhydride as esterifying agents, there were obtained the diacetate, dipropionate and dicaproate of 2-methylene-androstane-3β,17β-diol.

In a similar manner, starting from 2-hydroxymethylene-19-nor-androstan-17β-ol-3-one (obtained from 19-nor-androstan-17β-ol-3-one by the method described in U.S. Patent 2,908,693), there was produced 2-methylene-19-nor-androstane-3β,17β-diol as well as its dibenzoate, diacetate and dicaproate.

EXAMPLE VI

Example IV was repeated but using 2-hydroxymethylene-17α-ethynyl-19-nor-androstan-17β-ol-3-one as starting material. There were thus obtained 2-pyrrolidylmethylene-17α-ethynyl-19-nor-androstan-17β-ol-3-one and 2-methylene-17α-ethynyl-19-nor-androstane-3β,17β-diol.

furane solution, to give the respective 2-methylene-3β-hydroxy compounds (III).

| I | II | III |
|---|---|---|
| 2-hydroxymethylene-17α-ethyl-androstan-17β-ol-3-one. | 2-piperidylmethylene-17α-ethyl-androstan-17β-ol-3-one. | 2-methylene-17α-ethyl-androstane-3β, 17β-diol. |
| 2-hydroxymethylene-17α-methyl-19-nor-androstan-17β-ol-3-one. | 2-piperidylmethylene-17α-methyl-19-nor-androstan-17β-ol-3-one. | 2-methylene-17α-methyl-19-nor-androstane-3β, 17β-diol. |
| 2-hydroxymethylene-17α-methyl-testosterone. | 2-piperidylmethylene-17α-methyl-testosterone. | 2-methylene-17α-methyl-Δ⁴-androstene-3β, 17β-diol. |
| 2-hydroxymethylene-17α-methyl-19-nor-testosterone. | 2-piperidylmethylene-17α-methyl-19-nor-testosterone. | 2-methylene-17α-methyl-Δ⁴-19-nor-androstene-3β, 17β-diol. |
| 2-hydroxymethylene-19-nor-testosterone. | 2-piperidylmethylene-19-nor-testosterone. | 2-methylene-19-nor-Δ⁴-androstene-3β, 17β-diol. |

1 g. of the latter compound was esterified with propionic anhydride in pyridine solution, in a conventional manner, thus affording 2-methylene-17α-ethynyl-19-nor-androstane-3β,17β-diol-3-propionate.

EXAMPLE VII

In accordance with the method of Example II, 2 g. of 2-hydroxymethylene-testosterone were treated with dimethylamine in a sealed tube, thus giving 2-dimethylaminomethylene-testosterone.

To a solution of 1 g. of the above compound in 20 cc. of tetrahydrofuran and 2 cc. of water, there was added 1 g. of sodium borohydride, and the mixture refluxed for 6 hours. The excess of reagent was destroyed with acetic acid, and the solvents were then removed under vacuum. Water was added and the product extracted with methylene chloride, the organic extract was washed to neutral, dried over anhydrous sodium sulfate and evaporated to dryness. Crystallization of the residue from acetone-hexane gave 2-methylene-Δ⁴-androstene-3β,17β-diol.

Upon esterification of the latter compound with acetic, butyric and cyclopentylpropionic anhydrides in pyridine solution, there were obtained the diacetate, dibutyrate and dicyclopentylpropionate of 2-methylene-Δ⁴-androstene-3β,17β-diol.

EXAMPLE VIII

By following the method described in Example VII, 5 g. of 2-hydroxymethylene-17α-ethynyl-19-nor-testosterone were converted successively into 2-dimethylaminomethylene-17α-ethynyl-19-nor-testosterone and 2-methylene-17α-ethynyl-19-nor-Δ⁴-androstene-3-β,17β-diol.

A mixture of 1 g. of the latter compound, 4 cc. of pyridine and 2 cc. of cyclopentylpropionic anhydride was kept at room temperature overnight, poured into water and the formed precipitate collected, thus producing 2-methylene-17α-ethynyl-19-nor-Δ⁴-androstene-3β,17β-diol-3-cyclopentylpropionate.

The starting material, 2-hydroxymethylene-17α-ethynyl-19-nor-testosterone, was obtained by condensing 17α-ethynyl-19-nor-testosterone with ethylformate, in accordance with the method described in U.S. Patent 2,908,693.

EXAMPLE IX 1 g. of 2-methylene-17α-ethynyl-19-nor-Δ⁴-androstene-3β,17β-diol in 100 cc. of chloroform, distilled from calcium chloride was oxidized by stirring for 18 hours at room temperature with 10 g. of freshly precipitated manganese dioxide. The inorganic material was filtered, washed with hot chloroform and the solution evaporated. Recrystallization from acetone-hexane gave 2-methylene-17α-ethynyl-19-nor-testosterone.

EXAMPLE X

By following the method of Example I, the compounds listed below under I were condensed with piperidine, and the resulting piperidylmethylene compounds (II) reduced with sodium borohydride in methanol or tetrahydrofurane solution, to give the respective 2-methylene-3β-hydroxy compounds (III).

EXAMPLE XI

A mixture of 2 g. of 2-methylene-Δ⁴-androstene-3β,17β-diol in 40 cc. of dioxane, and 1.1 molar equivalents of 2,3-dichloro-5,6-dicyano-1,4-benzoquinone was kept at room temperature for 4 hours. The hydroquinone formed during the reaction was filtered off, and the filtrate evaporated to dryness. The residue was dissolved in acetone and filtered through 20 g. of alumina. Crystallization from acetone-hexane gave 2-methylene-testosterone.

A mixture of 1 g. of 2-methylene-testosterone, 4 cc. of pyridine and 2 cc. of undecenoic anhydride was kept at room temperature overnight, poured into ice water, the formed precipitate was filtered, washed with water and dried. Crystallization from acetone-hexane gave the undecenoate of 2-methylene-testosterone.

EXAMPLE XII

By following the method described in U.S. Patent 2,908,693, 17α-vinyl-testosterone was converted into 2-hydroxymethylene-17α-vinyl-testosterone.

The above compound was then treated with morpholine, in accordance with the method described in Example V, and the resulting 2-morpholinylmethylene compound reduced with selenium borohydride in tetrahydrofuran solution to give 2-methylene-17α-vinyl-Δ-androstene-3β,17β-diol.

In a similar manner, starting from 17α-vinyl-19-nor-testosterone, there were obtained the corresponding 19-nor-compounds.

EXAMPLE XIII

In accordance with the oxidation method described in Example XI, 2-methylene-17α-methyl-Δ⁴-androstene-3β,17β-diol, 2-methylene-17α-vinyl-Δ⁴-androstene-3β,17β-diol and 2-methylene-19-nor-Δ⁴-androstene-3β,17β-diol were converted into 2-methylene-17α-methyl-testosterone, 2-methylene-17α-vinyl-testosterone and 2-methylene-19-nor-testosterone.

EXAMPLE XIV

Examples XII and XIII were repeated but using as starting material the caproate of 17α-ethynyl-19-nor-testosterone, thus producing 2-methylene-17α-ethynyl-Δ⁴-androstene-3β,17β-diol-17-caproate and 2-methylene-17α-ethynyl-testosterone-caproate.

EXAMPLE XV

A mixture of 5 g. of 2-hydroxymethylene-17α-methyl-testosterone, 100 cc. of anhydrous benzene, 10 cc. of propionic anhydride and 1 g. of p-toluenesulfonic acid was allowed to stand for 24 hours at room temperature, poured into ice water and the resulting mixture was stirred to effect hydrolysis of the excess of anhydride. The benzene layer was separated and washed with 10% sodium carbonate solution and water. Drying, evaporation and crystallization of the residue from acetone hexane gave the propionate of 2-hydroxymethylene-17α-methyl-testosterone.

The above compound was condensed with pyrrolidine, and the resulting pyrrolidylmethylene derivative reduced with sodium borohydride in tetrahydrofuran solution to give the 17-propionate of 2-methylene-17α-methyl-Δ⁴-androstene-3β,17β-diol. Further esterification of this compound with acetic anhydride in pyridine solution gave 2 - methylene - 17α - methyl-Δ⁴-androstene-3β,17β-diol-3-acetate-17-propionate.

In similar manner, starting from 2-hydroxymethylene-17α-methyl-19-nor-testosterone, there were obtained the corresponding 19-nor-compounds.

EXAMPLE XVI 2 g. of 2-methylene-17α-methyl-19-nor-Δ⁴-androstene-3β,17β-diol-17-propionate were oxidized with 1.1 molar equivalents of dichloro-dicyano-benzoquinone, in accordance with the method of Example XI, thus affording 2-methylene-17α-methyl-19-nor-testosterone-propionate.

EXAMPLE XVII

By following the method described in U.S. Patent 2,908,693, 17α-propyl-testosterone and 17α-butyl-19-nor-testosterone were converted into the corresponding 2-hydroxymethylene derivatives. The above compounds were condensed with dimethylamine in a sealed tube, and the resulting 2-dimethylaminomethylene compounds were then reduced with sodium borohydride in tetrahydrofuran solution, in accordance with the method of Example VII, thus yielding 2 - methylene - 17α - propyl-Δ⁴-androstene-3β,17β-diol and 2-methylene-17α-butyl-19-nor-androstene-3β,17β-diol, respectively.

Upon oxidation of these compounds with dichloro-dicyano-benzoquinone, there were produced 2-methylene-17α-propyl-testosterone and 2-methylene-17α-butyl-19-nor-testosterone.

EXAMPLE XVIII

A mixture of 1 g. 2-methylene-17α-ethynyl-19-nor-androstane - 3β,17β - diol - 3 - propionate, obtained as described in Example VI, 40 cc. of acetic acid, 20 cc. of acetic anhydride and 1 g. of p-toluenesulfonic acid was kept at room temperature for 18 hours, then poured into water, and heated for 30 minutes on the steam bath to hydrolyze the excess of reagent. The formed precipitate was collected by filtration, and washed with water to neutral, thus producing 2-methylene-17α-ethynyl-19-nor-androstane-3β,17β-diol-3-propionate-17-acetate.

I claim:
1. A compound of the following formula:

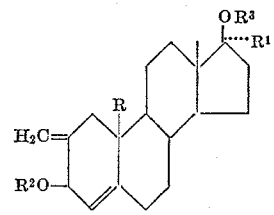

wherein R is selected from the group consisting of hydrogen and methyl; $R^1$ is selected from the group consisting of hydrogen, lower alkyl, lower alkenyl and lower alkynyl radicals containing up to 8 carbon atoms, and $R^2$ and $R^3$ are selected from the group consisting of hydrogen and a hydrocarbon carboxylic acid radical containing up to 12 carbon atoms.

2. 2-methylene-Δ⁴-androstene-3β,17β-diol.
3. 2-methylene-Δ⁴-19-nor-androstene-3β,17β-diol.
4. 2-methylene-17α-methyl-Δ⁴-androstene-3β,17β-diol.
5. 2 - methylene - 17α - ethynyl - 19 - nor - Δ⁴ - androstene-3β,17β-diol.
6. The dicyclopentylpropionate of 2-methylene-Δ⁴-androstene-3β,17β-diol.
7. In the process for making 2-methylene-3β-hydroxyandrostane derivatives, the step which comprises reduction of a 2-aminomethylene-3-keto-androstane compound with sodium borohydride.
8. The process in accordance with claim 7, in which the starting material is a piperidylmethylene-3-keto-androstane.
9. The process in accordance with claim 7, in which the starting material is a morpholinylmethylene-3-keto-androstane.

References Cited by the Examiner
UNITED STATES PATENTS 3,082,223  3/1963  Bowers et al. _____ 260—397.5
3,152,153  10/1964  Evans et al. _____ 260—397.4

LEWIS GOTTS, *Primary Examiner.*

MORRIS LIEBMAN, *Examiner.*

G. E. LANDE, J. R. GENTRY, J. R. BROWN,
*Assistant Examiners.*